US012596843B2

(12) United States Patent
Joehnk et al.

(10) Patent No.: US 12,596,843 B2
(45) Date of Patent: Apr. 7, 2026

(54) METHODS AND SYSTEM FOR CONTEXT-PRESERVING SENSITIVE DATA ANONYMIZATION

(71) Applicant: Proofpoint, Inc., Sunnyvale, CA (US)

(72) Inventors: Karl Felix Joehnk, Singapore (SG); Romain Loic Choukroun, Singapore (SG)

(73) Assignee: Proofpoint, Inc., Sunnyvale, CA (US)

( * ) Notice: Subject to any disclaimer, the term of this patent is extended or adjusted under 35 U.S.C. 154(b) by 114 days.

(21) Appl. No.: 18/629,338

(22) Filed: Apr. 8, 2024

(65) Prior Publication Data

US 2024/0338485 A1 Oct. 10, 2024

(30) Foreign Application Priority Data

Apr. 6, 2023 (SG) ........................... 10202300949Q

(51) Int. Cl.
*G06F 21/62* (2013.01)
*G06N 20/00* (2019.01)
(52) U.S. Cl.
CPC ......... *G06F 21/6254* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 2019/0238516 A1* | 8/2019 | Weggenmann | G06F 21/6254 |
| 2020/0380254 A1* | 12/2020 | Zeng | G06V 30/416 |
| 2021/0149993 A1* | 5/2021 | Torres | G06V 10/40 |
| 2021/0182935 A1* | 6/2021 | Malkiel | G06F 16/3347 |

* cited by examiner

*Primary Examiner* — Scott B Christensen
(74) *Attorney, Agent, or Firm* — Banner & Witcoff, Ltd.

(57) ABSTRACT

Systems and methods for privacy-preserving transformer model training are provided. The system includes one or more data repositories in a computer network or cloud infrastructure having data stored therein. The system anonymizes the data in the one or more documents, and trains a transformer model on the data outside of the network. The data includes sensitive information. Anonymizing the data is includes extracting the data from the one or more documents and irreversibly transforming the data in the one or more documents into context-preserving tensors. Training the transformer model on the data comprises using the context-preserving tensors instead of the data to train the transformer model on the data.

22 Claims, 5 Drawing Sheets

200

340

Output Tensor

330

1. Multi-head Self-Attention

124a

Embedding Layer

122

320

Tokenized text

114

Input text

300

112

METHODS AND SYSTEM FOR CONTEXT-PRESERVING SENSITIVE DATA ANONYMIZATION

PRIORITY CLAIM

This application claims priority from Singapore Patent Application No. 10202300949Q filed on 6 Apr. 2023.

TECHNICAL FIELD

The present invention relates generally to data classification, privacy and security, and more particularly relates to methods and systems for context-preserving sensitive data anonymization in order to fine-tune deep learning models for context-aware data classification.

BACKGROUND OF THE DISCLOSURE

Highly parameterized, pretrained transformer models build the very foundation of modern state of the art solutions for various natural language processing problems. They enable fine-tuning for individual downstream tasks with little effort, making them particularly useful and easy-to-use in data classification.

However, the main issue with transformer models is that they require using raw text data when fine-tuning them. Due to the sensitivity of the data used to fine-tune transformer models on (such as sensitive documents owned by clients), there are no relevant documents available to pre-train document classification models. In parallel, it is not possible to download the data of clients to fine-tune transformer models. Indeed, while client documents stored in private networks or cloud data repositories do not need to be encrypted at rest to be secured, downloading their content in order to pre-train models raises concerns with regards to privacy and the risk of leakage of sensitive information. Even by following security best practices, there is a high risk to keep raw data in a centralized location for training.

Currently, it is not possible to fine-tune transformer models in a centralized way for data classification while preserving privacy as conventional transformer model fine-tuning requires downloading client documents in their raw shape and implementing an encryption/decryption system for the data. The cryptographic methods used to encrypt the data typically entail a burden in terms of computation cost and accuracy. In addition, the use of decryption adds additional risk and violates the principle of maintaining the client's privacy.

Further, the actual embedding layer used by most transformer models to transform text into machine-readable vectors does not solve this problem as it is a reversible method. In the case of the language model BERT (Bidirectional Encoder Representations from Transformers), a language representation model based on transformer architecture, a linear combination of word-embedding, position-embedding and token-type-embedding is the method used to transform text into machine-readable vectors, yet this method is a reversible method.

Thus, there is a need for methods and systems for fine-tuning transformer models that overcome the drawbacks of prior art approaches and does not require downloading the raw data of clients. Other desirable features and characteristics of these methods and systems will become apparent from the subsequent detailed description and the appended claims, taken in conjunction with the accompanying drawings and this background of the disclosure.

SUMMARY

According to an embodiment of the present invention, a method for privacy-preserving transformer model training is provided. The method includes extracting data from one or more documents in one or more data repositories in a computer network or cloud infrastructure, the data including sensitive information. The method further includes anonymizing the data by irreversibly transforming the data into context-preserving tensors and training a transformer model on the data using the context-preserving tensors.

In accordance with another embodiment of the present invention, a privacy-preserving system for transformer model training is provided. The system includes one or more data repositories in a computer network or cloud infrastructure having data stored therein, a means for anonymizing the data in the one or more documents, and a means for training a transformer model on the data. The data includes sensitive information. The means for anonymizing the data is configured to extract the data from the one or more documents and to irreversibly transform the data in the one or more documents into context-preserving tensors. And the means for training a transformer model on the data is configured to use the context-preserving tensors instead of the data to train the transformer model on the data.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Figure 1:
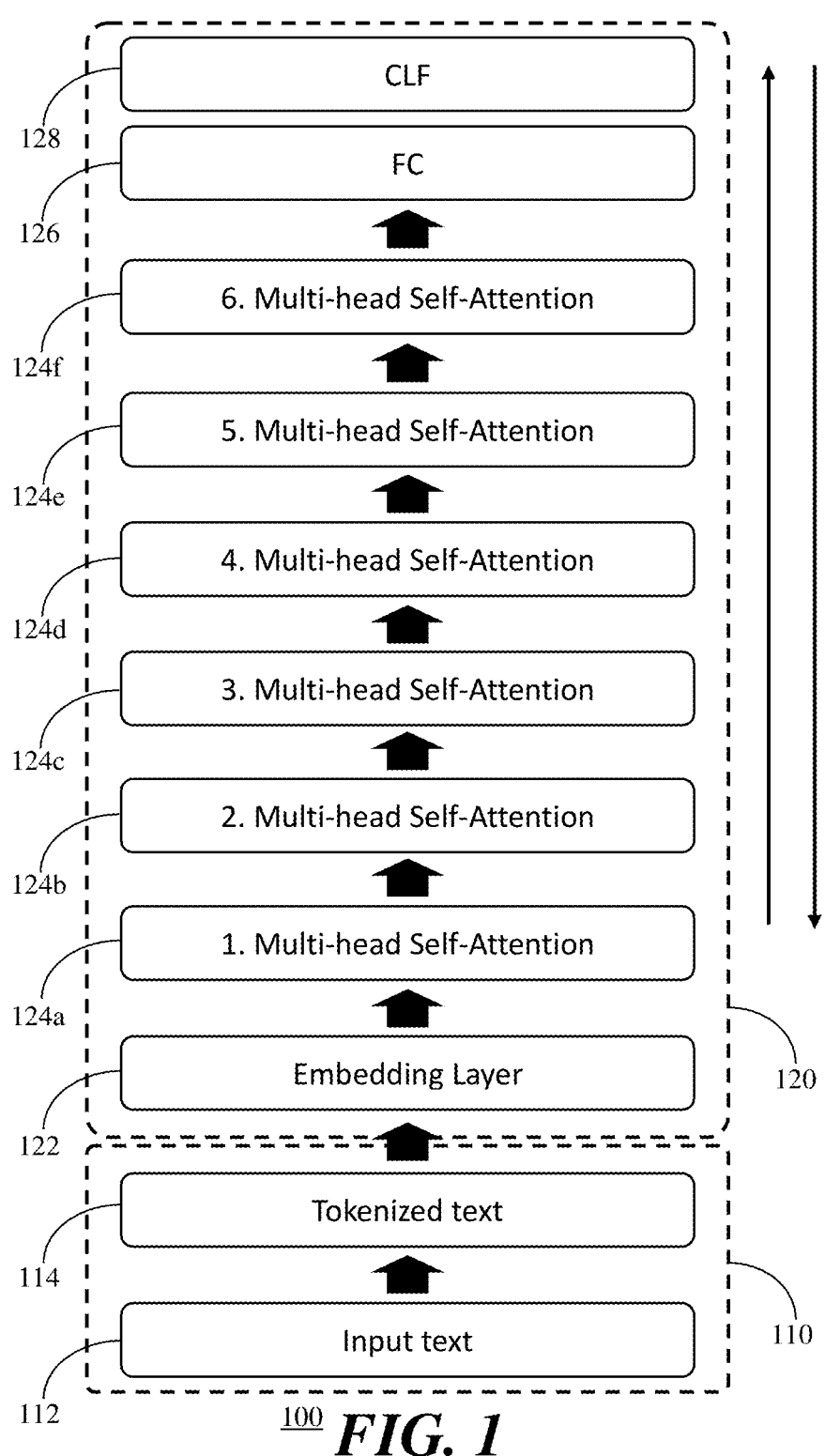
FIG. 1 depicts a flow diagram of data classification in an exemplary transformer-based model.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiments to present novel methods and systems to anonymize sensitive client data while still enabling the fine-tuning of transformer models for data classification tasks. In accordance with the present embodiments, the raw sensitive client data is anonymized into tensors, while preserving its contextual information, in order to fine-tune transformer-based models in a central location. Tensors are mathematical objects, such as vectors or scalars, which can be used to describe multilinear properties, such as physical properties. In accordance with the present embodiments, the anonymization of the raw data into tensors preserves the contextual properties of the raw data while obscuring access to or reconstructing of the raw data. The present embodiments address the problem that, even by following security best practices, there is a high privacy and security risk, as well as legal challenges, to keep raw data in a centralized location for training. Thus, the present embodiments provide systems and methods which are particularly useful and easy-to-use in data classification.

In order to fine-tune transformer models without downloading the raw data of clients, a novel two-step training approach is provided which vectorizes the raw text in an irreversible way in a first step at the client's side, and only fine tunes a pretrained model on the vectors in a second step performed in an environment outside the client.

The key property of transformer models is that the most general contextual information is learned within the lower layers and more task-specific information is kept in its higher layers. Thus, the method in accordance with the present embodiments freezes the lower layer's gradients and forwards the raw text through the first layer, enabling fine-tuning on higher layers with little to no impact on the model's performance.

Thus, a method for vectorizing data in an irreversible way using the first multi-head self-attention layer of the transformer model on the client side is provided in accordance with the present embodiments. The method includes scanning documents including structured, semi-structured or unstructured documents in one or more network data repositories of a computer network or repository on the cloud, extracting their content, and then vectorizing the content in a forward pass through a first non-reversible layer or layers to anonymize the client's data.

Thus, the methods and systems in accordance with the present embodiments extract the vectorized data and labels from the client and enable downloading the vectorized data and labels to fine-tune data classification transformer models in a privacy-preserving manner. Furthermore, the vectorization methods in accordance with the present embodiments advantageously use only an initial transformer block of the transformer model to encrypt client data in a non-reversible way. Accordingly, it can be seen that the methods and systems in accordance with the present embodiments can be used for accuracy gain as compared to out-of-the-box unstructured data classification, while also being used to preserve the privacy of the data leveraged to fine-tune the classifiers while beneficially providing the same classification results as the use of raw client data when fine-tuning transformer models.

The methods and systems in accordance with the present embodiments leverage the irreversibility property of multi-head self-attention layers found in transformer-based models in order to vectorize client data. Referring to FIG. 1, a flow diagram 100 depicts a flow of data classification in an exemplary transformer-based model. The flow diagram 100 depicts pre-processing steps 110 and steps in an exemplary transformer model 120. The pre-processing steps 110 generate tokenized text 114 from the input text 112. After tokenization, the tokenized text 114 is provided to the transformer model 120 which includes an embedding layer 122, multiple multi-head self-attention layers 124, a fully connected (FC) layer 126 and a classifier (CLF) layer 128. While the input text 112, the tokenized text 114 and the data in the embedding layer 122 are reversible, the data in the multi-head self-attention layers 124a, 124b, 124c, 124d, 124e, 124f is non-reversible or irreversible. The irreversibility property of multi-head self-attention layers in transformer-based models lies in the size of vectors used in Deep Learning transformer models.

Figure 2:
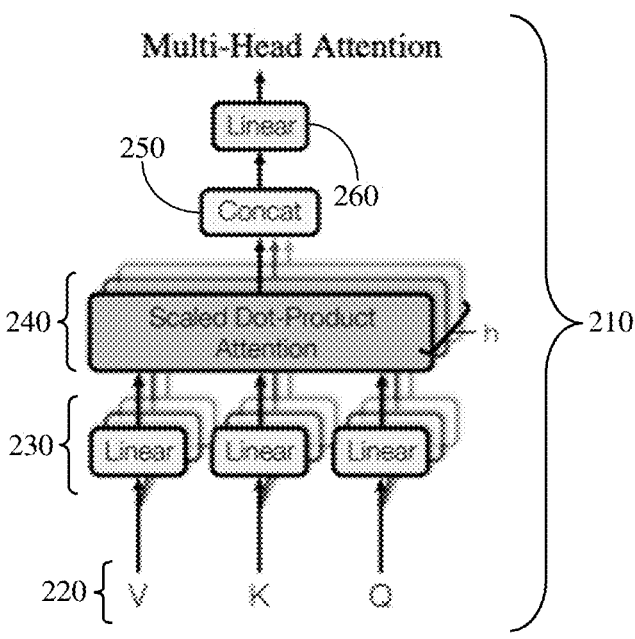
FIG. 2 depicts an exemplary illustration of irreversibility of a multi-head self-attention layer in accordance with the present embodiments.

Referring to FIG. 2, a diagram 200 depicts an illustrative example of irreversibility of a multi-head self-attention layer 210 such as the multi-head self-attention layers 124a, 124b, 124c, 124d, 124e, 124f of FIG. 1. A multi-head self-attention layer is a module for attention mechanisms which runs through an attention mechanism several times in parallel. Concerning the concept of irreversibility, where A and B are matrices and $A*B=C$, one can only determine A from C if B can be invertible (i.e., if $B^{-1}$ exists, C can be determined from A by using the equation $C*B^{-1}=A$). However, the Invertible Matrix Theorem states that only n×n square matrices can be invertible, the Invertible Matrix Theorem being a theorem in linear algebra which gives a series of equivalent conditions for an n×n square matrix to have an inverse.

So, with this information, the multi-head self-attention layer 210 exemplifies irreversibility in its operation in that matrices of, for example, values (V), keys (K) and queries (Q), provided as input 220 are not square matrices and, thus, are not invertible. The values, keys and queries are linearly projected h times in parallel with each linear projection 230 projecting the values, keys and queries with different, learned linear projections to dv, dk and dq dimensions, respectively. On each of these projected versions of values, keys and queries, a scaled dot-product attention function 240 is performed in parallel, yielding dv-dimensional output values. Scaled dot-product attention 240 is fast and space-efficient as it can be implemented using highly optimized matrix multiplication code.

The output values from the scaled dot-product attention function 240 are concatenated 250 and once again linearly projected 260, resulting in final values. Advantageously, even if the input 220 is a sensitive input, the final values are non-sensitive and irreversible, yet retain the task-specific information of the input data. And using multi-head self-attention allows the model to jointly attend to information from different representation subspaces (i.e., the values, keys and queries matrices of information provided as input data) at different positions.

Figure 3:
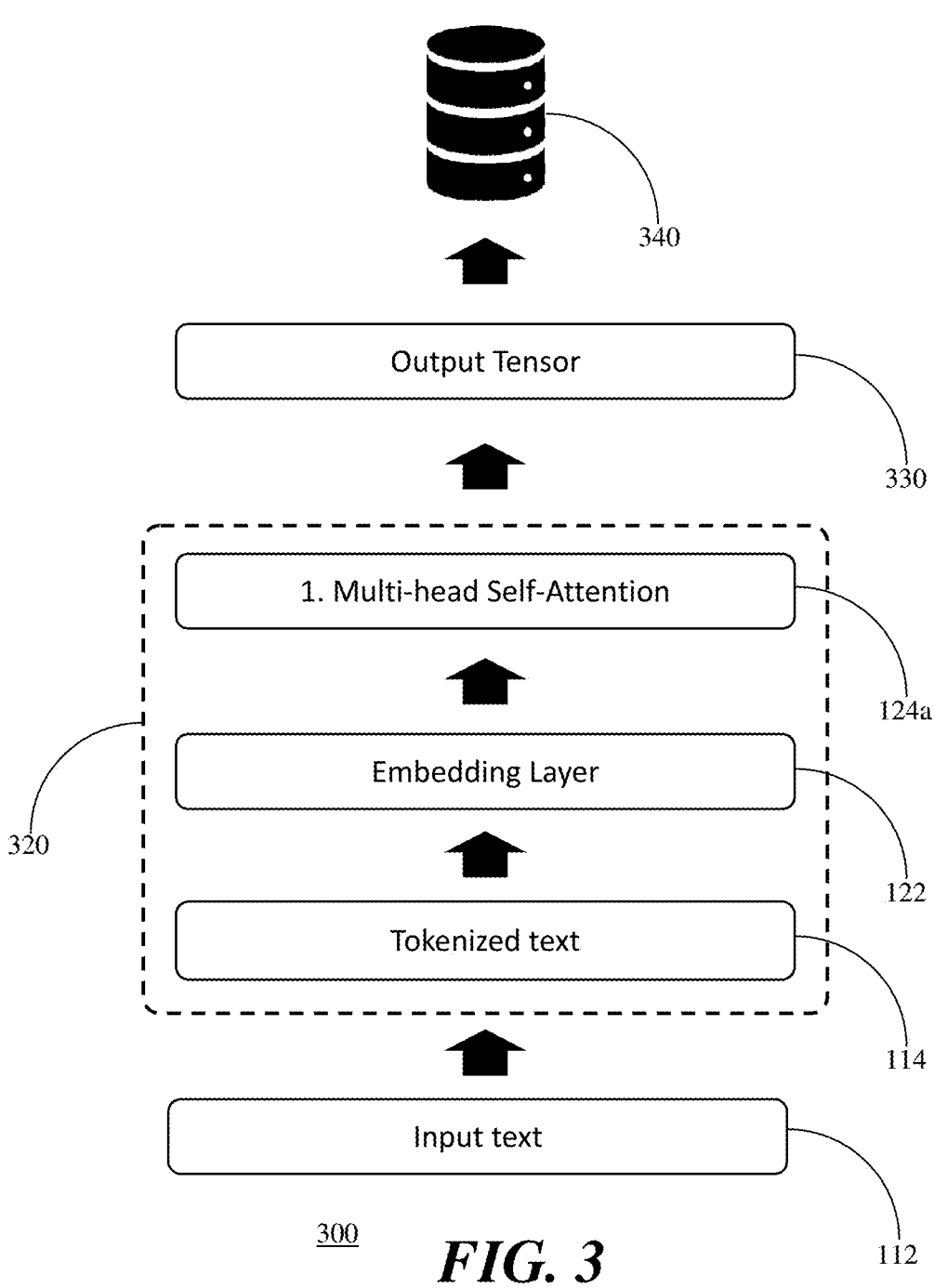
FIG. 3 depicts a flow diagram of layer dropping and vectorization of data as a first step of transformer model training in accordance with the present embodiments.
Figure 4:
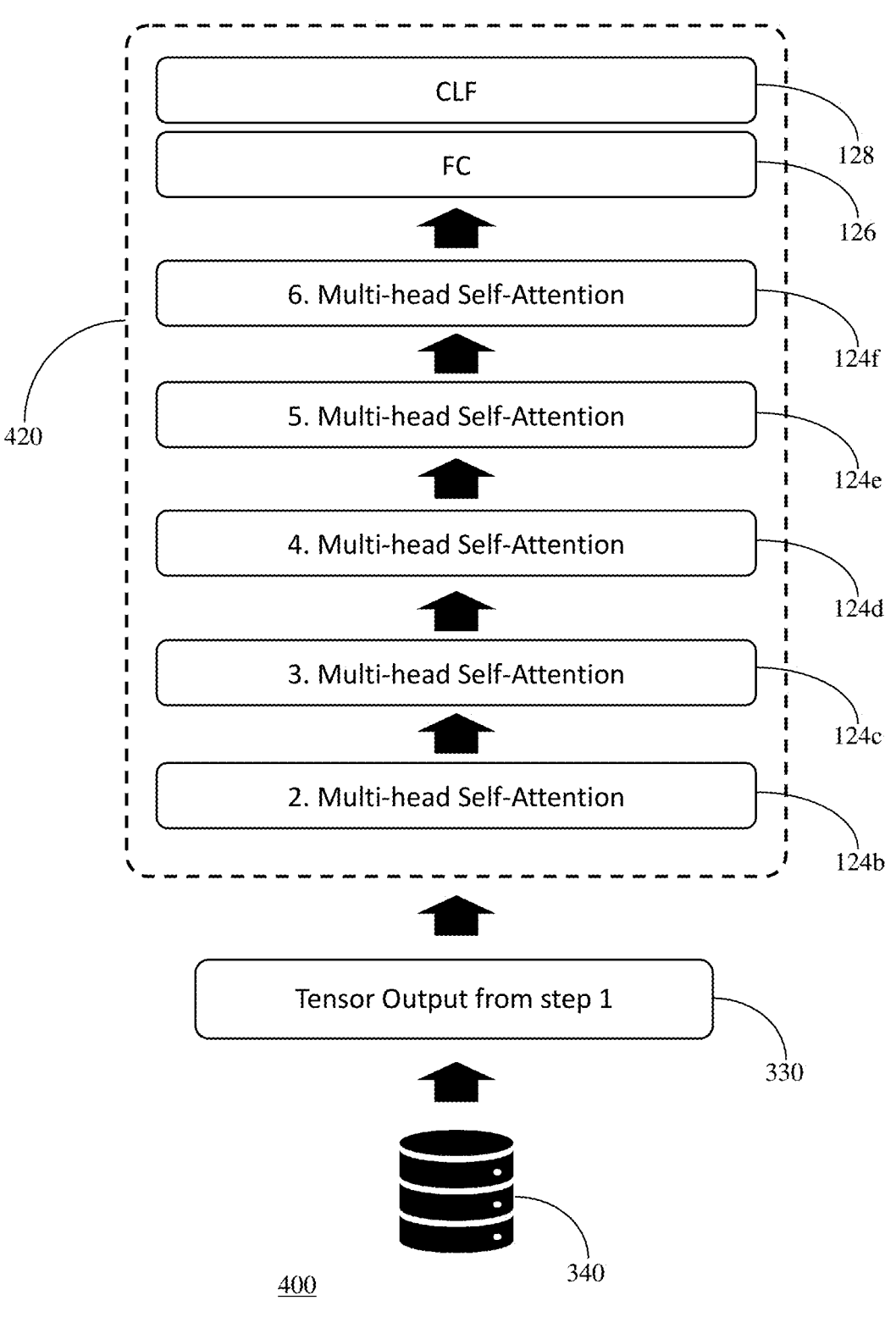
FIG. 4 depicts a flow diagram of transformer model fine-tuning as a second step of the transformer model training in accordance with the present embodiments.

FIGS. 3 and 4 depict the novel transformer model training process in accordance with the present embodiments where the transformer model training process is divided into two steps: a first step performed within the client's environment, such as within the client's network, to protect the privacy and security of the input text 112, and a second step performed outside the client's environment. Referring to FIG. 3, a flow diagram 300 depicts layer-dropping and vectorization as the first step in the transformer model training process in accordance with the present embodiments. The tokenized text 114 is generated from the input text 112 in accordance with any known tokenizing functions. After tokenizing, the tokenized text 114 is provided to a transformer model 320 which includes the embedding layer 122 and an initial multi-head self-attention layer 124a for deep learning of the content of the tokenized text 114 to irreversibly transform the tokenized text 114 into context-preserving output tensors 330, such as vectors. The vectorization is performed within the client's environment in order to preserve the secrecy of the content of the input text 112, thereby anonymizing the client's data and preserving the privacy of their sensitive information. The output tensors 330 can be stored in a storage device 340 for utilization in a second step in the transformer model training process in accordance with the present embodiments.

Referring to FIG. 4, a flow diagram 400 depicts transformer model fine-tuning as a second step in a transformer model training process in accordance with the present embodiments. Initially, the output tensors 330 are retrieved from the storage device 340 and provided to a multi-level transformer model 420 which includes additional multiple multi-head self-attention layers 124b, 124c, 124d, 124e, 124f, a fully connected (FC) layer 426 and a classifier (CLF) layer 428. As the lower layer's gradients have been frozen in the tensor output 330, fine-tuning can be performed in the multiple multi-head self-attention layers 124b-124f of the transformer model 420 without any degradation in the performance of the transformer model 420. In other words, inputting the tensor output 330 to the multi-level transformer model 420 enables fine-tuning of the transformer model 420 in the same manner as raw data without downloading the data outside of the client's network, thereby preserving the privacy of sensitive raw data. In this manner, the methods and systems in accordance with the present embodiments extract the tensor output from the client to fine-tune and retrain data classification transformer models in a privacy-preserving manner.

Figure 5:
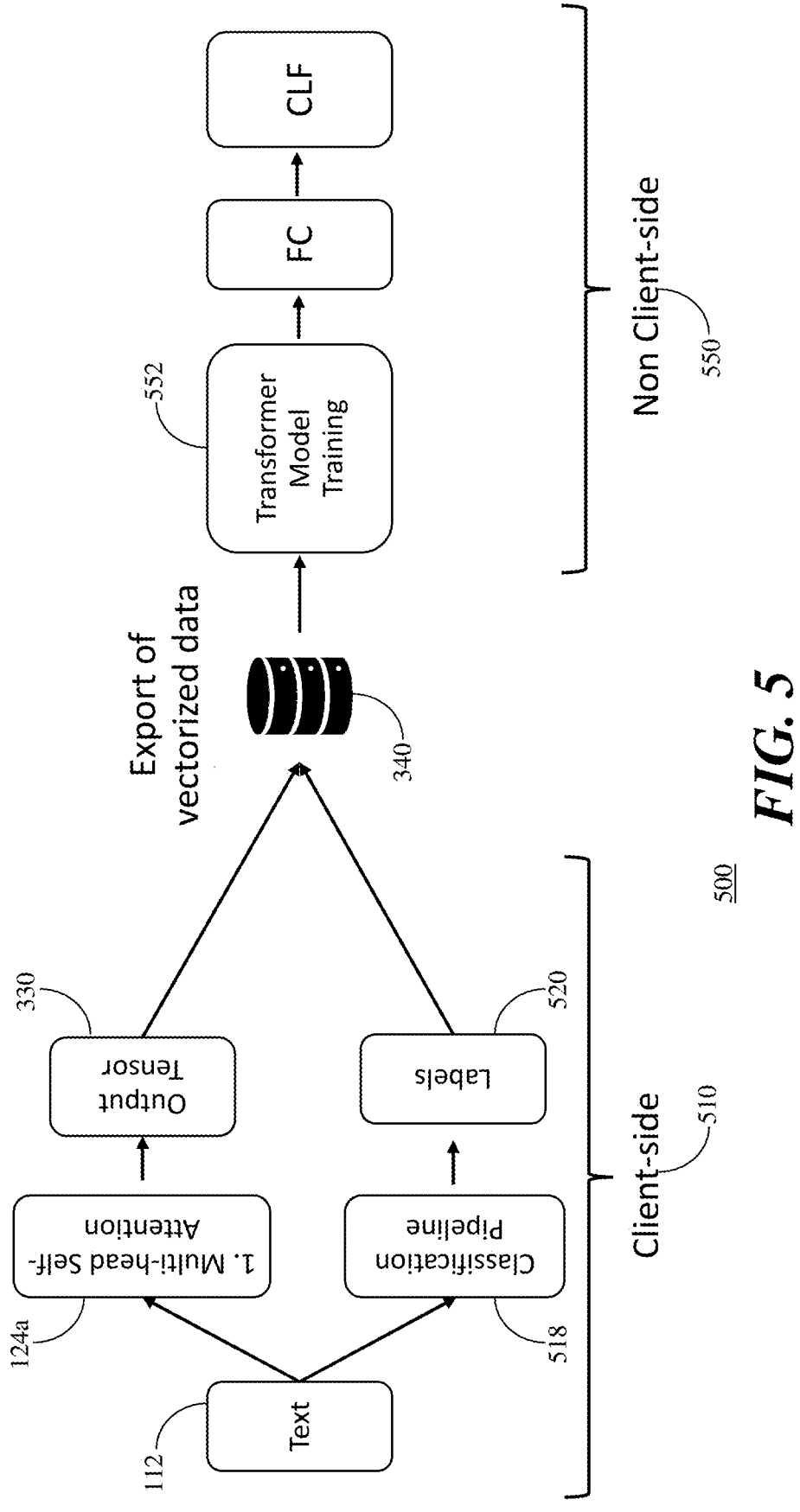
FIG. 5 depicts a block diagram of an exemplary two-stage Bidirectional Encoder Representations from Transformers (BERT) system for transformer model training in accordance with the present embodiments.

FIG. 5 depicts a block diagram 500 of an exemplary two-stage Bidirectional Encoder Representations from Transformers (BERT) system for transformer model training in accordance with the present embodiments. Within a client's environment 510, means is used to extract the text 112 from documents stored in data repositories in a computer network or cloud infrastructure and anonymize data in the extracted text 112 using the initial multi-head self-attention layer 124a of a transformer model to irreversibly transform the extracted text 112 into the output tensors 330. The extracted text 112 is also provided to a classification pipeline 518 which generates classification labels 520 used in the training of the transformer model. The output tensors 330 and the labels 520 are stored within a storage device 340 accessible from outside the client's environment 510.

A transformer model training system 552 at a location 550 outside the client's environment 510 can include the multiple multi-head self-attention layers 124b, 124c, 124d, 124e, 124f (FIG. 4) and retrieves the tensors 516 and the labels 520 from the storage device 525 to perform fine-tuning a pre-trained transformer model for data classification using the tensors 516 (which have preserved the context of the text 512) and the labels 520.

In this manner, the methods and systems in accordance with the present embodiments extract the tensor output and labels from the client to fine-tune and retrain data classification transformer models in a privacy-preserving manner. This is enabled by leveraging the irreversibility property of multi-head self-attention layers found in transformer-based models in order to vectorize client data in the initial multi-head self-attention layer 514 of a transformer model. The irreversibility property lies in the size of vectors used in Deep Learning transformer models. As proven by the invertible matrix theorem discussed at FIG. 2, only square matrices can be inverted, which is not the case of the embedding layers used in BERT, or its lighter version distilled BERT (distil-BERT). While the block diagram 500 depicts a two-stage BERT system, those skilled in the art will realize that the BERT system could be replaced by any similar transformer model system.

The non-reversible vectorized data 330 resulting from feeding the raw client data through the first transformer block 124a can then be extracted in a pickle format or any serialized file format allowing the extraction of vector weights in order to pool data from different clients and fine-tune classification models with enough data.

Comparison results between standard transformer models trained with raw data and transformer models in accordance with the present embodiments trained with vectorized data can be found in Table 1 below.

TABLE 1

| Model | F1-score diff |
|---|---|
| Standard Transformer (transformer trained with raw data) | 0% |
| Present Embodiment (transformer trained with vectorized data) | ±1% |

While the results may vary slightly depending on the pseudo-random seed chosen and the stochastic nature of the individual algorithms, the key conclusion outlined by the results is that there is no statistically significant drop in performance using the transformer models of the methods and systems in accordance with the present embodiments as compared to a transformer model trained using a conventional approach. As the methods and systems in accordance with the present embodiments provide the added value of privacy, the results above indicate that the methods and systems in accordance with the present embodiments provide a great advantage in the field of data privacy and security as compared to conventional methods Thus, it can be seen that the present embodiments improves the results of out-of-the-box document classification while preserving the privacy of client data. The methods and systems in accordance with the present embodiments leverage the irreversibility property of multi-head self-attention layers found in transformer-based models in order to vectorize client data. The methods and systems in accordance with the present embodiments provide a novel two-step training approach which vectorizes the raw text in an irreversible way in a first step at the client's side, and only fine tunes a pretrained model on the vectors or trains a transformer model in a second step performed in an environment outside the client. The anonymization of the raw data into tensors by the methods and systems in accordance with the present embodiments advantageously preserves the contextual properties of the raw data while obscuring access to or reconstructing of the raw data. It can be seen that the methods and systems in accordance with the present embodiments can be used for accuracy gain compared to out-of-the-box unstructured data classification, while also being used to preserve the privacy of the data leveraged to fine-tune the classifiers and beneficially providing the same classification results as the use of raw client data when fine-tuning transformer models.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A method for privacy-preserving transformer model training comprising:

extracting data from one or more documents in one or more data repositories in a computer network or cloud infrastructure, the data comprising sensitive information;

anonymizing the data by irreversibly transforming the data into context-preserving tensors, wherein irreversibly transforming the data into the context-preserving tensors comprises utilizing a transformer model for deep learning of the data by:

determining, by a first set of layers of the transformer model and based on a non-square matrix representation of the data, gradients, wherein the gradients are frozen for processing by a second set of layers of the transformer model, and fine-tuning, by the second set of layers of the transformer model, the gradients; and training the transformer model on the data using the context-preserving tensors.

2. The method in accordance with claim 1, wherein the one or more data repositories in the computer network or the cloud infrastructure in which the one or more documents reside are within a client's environment, and wherein anonymizing the data is performed within the client's environment.

3. The method in accordance with claim 2, wherein training the transformer model on the data comprises fine-tuning for data classification on the context-preserving tensors.

4. The method in accordance with claim 3, wherein fine-tuning the transformer model for data classification is performed outside the client's environment.

5. The method in accordance with claim 2, wherein training the transformer model on the data comprises fine-tuning a pre-trained transformer model for data classification on the context-preserving tensors.

6. The method in accordance with claim 5, wherein fine-tuning the pre-trained transformer model for data classification is performed outside the client's environment.

7. The method in accordance with claim 1, wherein the one or more documents comprise one of: structured documents, semi-structured documents, or unstructured documents.

8. The method in accordance with claim 1, wherein the deep learning of the data in each layer in the first set of layers and the second set of layers of the transformer model comprises multi-head self-attention transformation of the data.

9. The method of claim 8, wherein the multi-head self-attention transformation of the data comprises:

performing linear projection of a plurality of input matrices comprising the data, and wherein performing the linear projection comprises linearly projecting each of the plurality of input matrices a plurality of times to produce different learned linear projections for each input matrix;

performing, on each of the different learned linear projections in parallel, a scaled dot-product attention function to produce dimensional output values;

concatenating the dimensional output values; and linearly projecting the dimensional output values to produce the context-preserving tensors, wherein the context-preserving tensors are irreversible and non-sensitive despite the inclusion of sensitive data in the input matrices.

10. The method in accordance with claim 1, wherein irreversibly transforming the data in the one or more documents into the context-preserving tensors utilizing the transformer model comprises irreversibly transforming the data in the one or more documents by an initial layer of the first set of layers of the transformer model.

11. The method in accordance with claim 1, wherein irreversibly transforming the data extracted from the one or more documents into the context-preserving tensors comprises vectorizing the data.

12. A privacy-preserving system for transformer model training comprising:

one or more data repositories in a computer network or cloud infrastructure having data stored therein, the data comprising sensitive information;

one or more non-transitory computer-readable media storing instructions that, when executed by the privacy-preserving system cause the privacy-preserving system to:

anonymize the data in one or more documents in the one or more data repositories in the computer network or the cloud infrastructure by:

extracting the data from the one or more documents and irreversibly transforming the data in the one or more documents into context-preserving tensors, wherein irreversibly transforming the data into the context-preserving tensors comprises utilizing a transformer model for deep learning of the data by:

determining, by a first set of layers of the transformer model and based on a non-square matrix representation of the data, gradients, wherein the gradients are frozen for processing by a second set of layers of the transformer model, and fine-tuning, by the second set of layers of the transformer model, the gradients; and train the transformer model on the data using the context-preserving tensors instead of the data to train the transformer model on the data.

13. The privacy-preserving system in accordance with claim 12, wherein the data is anonymized within a client's environment.

14. The privacy-preserving system in accordance with claim 12, wherein training the transformer model on the data comprises performing one or both of:

fine-tuning the transformer model for data classification on the context-preserving tensors, or fine-tuning a pre-trained transformer model for data classification on the context-preserving tensors.

15. The privacy-preserving system in accordance with claim 14, wherein the transformer model is trained on the data is outside a client's environment.

16. The privacy-preserving system in accordance with claim 12, wherein the training the transformer model comprises using the context-preserving tensors and classification labels generated from the data to train the transformer model on the data.

17. The privacy-preserving system in accordance with claim 12, further comprising a data storage device, wherein anonymizing the data further comprises storing the context-preserving tensors in the data storage device, and wherein training the transformer model further comprises retrieving the context-preserving tensors from the data storage device.

18. The privacy-preserving system in accordance with claim 12, wherein the one or more documents comprise one of: structured documents, semi-structured documents, or unstructured documents.

19. The privacy-preserving system in accordance with claim 12, wherein each layer of the first set of layers and the second set of layers of the transformer model comprises a multi-head self-attention layer for transformation of data.

20. The privacy-preserving system in accordance with claim 12, wherein an initial layer of the first set of layers of the transformer model irreversibly transforms the data into the context-preserving tensors.

21. The privacy-preserving system in accordance with claim 12, wherein anonymizing the data comprises irreversibly transforming the data extracted from the one or more documents into the context-preserving tensors by vectorizing the data.

22. The privacy-preserving system in accordance with claim 19, wherein the multi-head self-attention transformation of the data comprises:

performing linear projection of a plurality of input matrices comprising the data, and wherein performing the linear projection comprises linearly projecting each of the plurality of input matrices a plurality of times to produce different learned linear projections for each input matrix;

performing, on each of the different learned linear projections in parallel, a scaled dot-product attention function to produce dimensional output values;

concatenating the dimensional output values; and linearly projecting the dimensional output values to produce the context-preserving tensors, wherein the context-preserving tensors are irreversible and non-sensitive despite the inclusion of sensitive data in the input matrices.

* * * * *